United States Patent [19]

Larkin

[11] 3,866,650
[45] Feb. 18, 1975

[54] INTERNAL LOCKING DEVICE
[75] Inventor: Artemas M. Larkin, Glendale, Calif.
[73] Assignee: Lockheed Aircraft Corporation, Burbank, Calif.
[22] Filed: May 25, 1973
[21] Appl. No.: 364,193

Related U.S. Application Data
[62] Division of Ser. No. 94,696, Dec. 3, 1970, Pat. No. 3,736,010.

[52] U.S. Cl. ............................................ 151/21 C
[51] Int. Cl. ............................................ F16b 39/00
[58] Field of Search ........................ 151/21 C, 21 R

[56]         References Cited
         UNITED STATES PATENTS
2,391,513  12/1945  Randall ............................. 151/21 R
2,495,409  1/1950   Costello ............................ 151/21 C
2,643,845  6/1953   Baker ............................... 151/21 C
3,385,339  5/1968   Dahl ................................ 151/21 R
3,697,187  10/1972  Faber et al. ....................... 151/21 C Primary Examiner—Geo V. Larkin
Attorney, Agent, or Firm—Billy G. Corber; Frank L. Zugelter; Lowell G. Turner

[57] ABSTRACT

An internal locking device for two elements, such as connecting rods, is disclosed. A pair of spaced circumferential grooves are provided in a cylindrical element (calibrated sleeve) threadedly circumscribing a second rod, and an interior annular groove is also provided in such element, being disposed between the planes of the circumferential grooves. Upon tightening of the cylindrical element against a first rod by means external to the cylindrical element, such as by a threaded sleeve forming a union between external threads on the first rod and the cylindrical element, the threads on the cylindrical element compress against the threads of the second rod, thereby eliminating any tolerance spread or slop that otherwise would exist between such threaded connection and achieving an exact locked position for such rods. The positions of the circumferential grooves and the annular groove are reversible, with the same effect being achieved.

9 Claims, 11 Drawing Figures

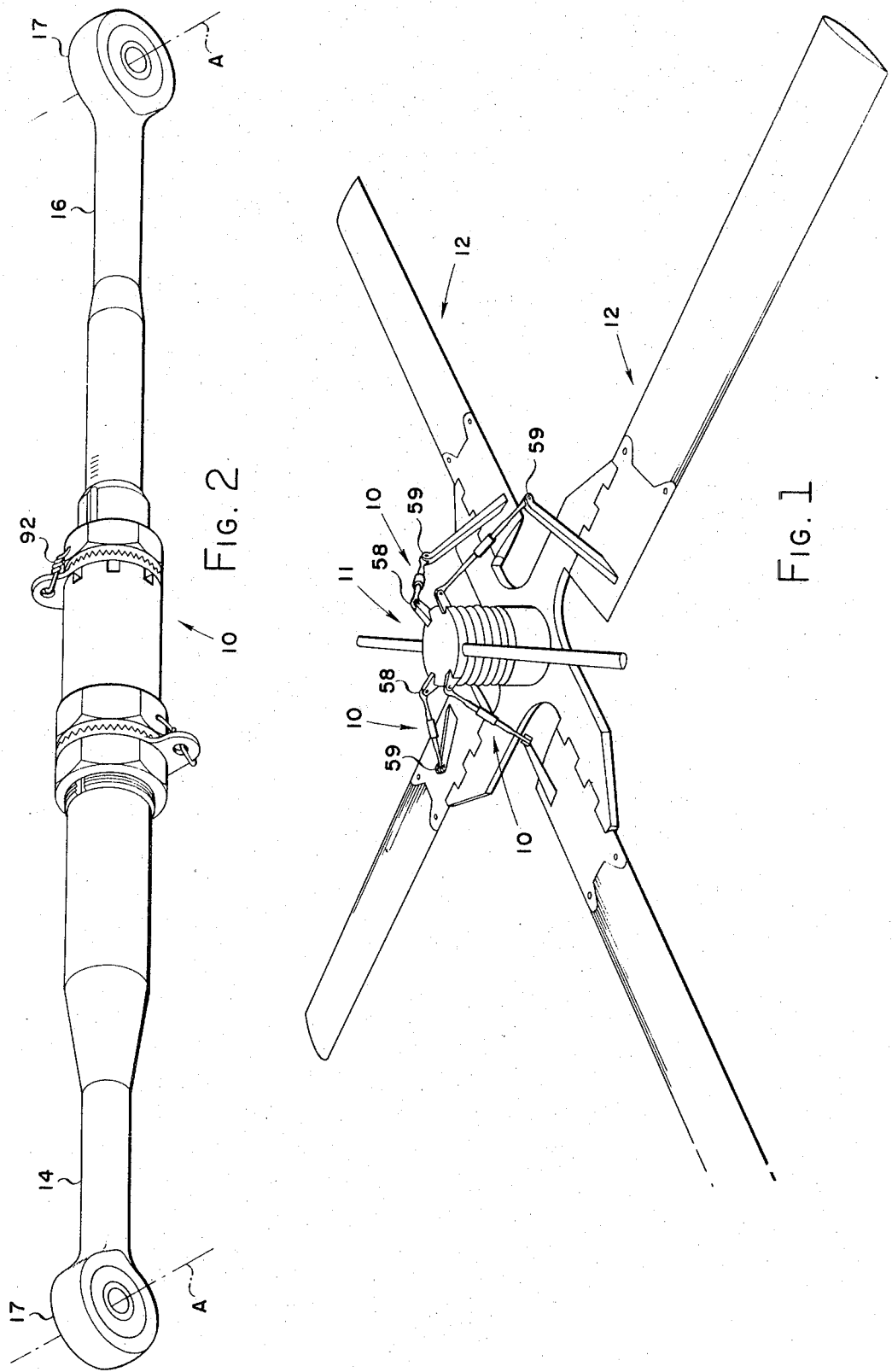

3,866,650

INTERNAL LOCKING DEVICE

CROSS-REFERENCE

This application is a divisional application of Ser. No. 94,696, filed Dec. 3, 1970, and which matured into U.S. Letters Pat. No. 3,736,010, issued May 29, 1973.

STATEMENT OF GOVERNMENT INTEREST

The invention herein described was made in the course of or under a contract or subcontract thereunder, with the Department of the Army.

BACKGROUND OF THE INVENTION

1. Field of the Invention

The field of art to which the invention is most likely to pertain is located in classes of devices generally relating to pitch link or connecting rod assemblies and locking devices. Classes 151, Nut and Bolt Locks, and 287, Rod Joints or Couplings, U.S. Patent Office Classifications, may be the applicable general areas of art in which the claimed subject matter of the types involved here may be classified.

2. Description of the Prior Art

Examples of prior art devices in the arts to which this invention most likely pertains are U.S. Pat. Nos. 609,144; 1,975,215; 2,367,259; 2,442,691; 2,445,696; 2,940,784; and 2,956,604; .

SUMMARY OF THE INVENTION

Objects of this invention are to provide a novel connecting rod assembly and a novel internal locking device.

Another object of this invention is to provide infinite axial adjustment for the assembly.

A further object of the invention is to provide elimination of screw-thread pitch tolerance due to differences in pitch diameter tolerance for two threaded elements, upon final tightening adjustment for the length of a connecting rod assembly.

An object of this invention is to provide the advantage of tightening and loosening a locking device used in an internal environment from a position external to the locking device while maintaining a free or open axial or interior volume for such a device.

Another object of the invention is to provide avoidance of deforming beyond the elastic limit the material of a locking device upon applying a locking force thereto, by dimensionally restricting the binding movement between surface-to-surface contact of the locking features in the device upon another element being locked.

A further object of the invention is to provide an exact locking feature for two connected elements by eliminating a tolerance spread which otherwise occurs between the threads of one of such elements and the internal locking device by compressing the latter's threads frm an exterior point without exceeding the elastic limits of the material thereof.

A further object of this invention is to provide repeatability of use of a locking device which has not been pre-stressed by not exceeding the elastic limits of the material of the locking device.

Another object of this invention is to provide precise adjustability in the length of a connecting rod assembly.

Another object of this invention is the provision of an effective locking feature disposed internally of two connecting elements and which is actuated externally thereof.

These and other objects and advantages will become more apparent from a full reading of the following description, appended claims thereto, and the accompanying drawing.

BRIEF DESCRIPTION OF THE DRAWINGS

FIG. 1 is a perspective view of a gyro, rotor blade and pitch link assemblies for a rotary wing aircraft.

FIG. 2 is a perspective view of an assembled pitch link assembly incorporating the preferred embodiment of this invention.

BACKGROUND TO THE CLAIMED INVENTION

Figure 4:
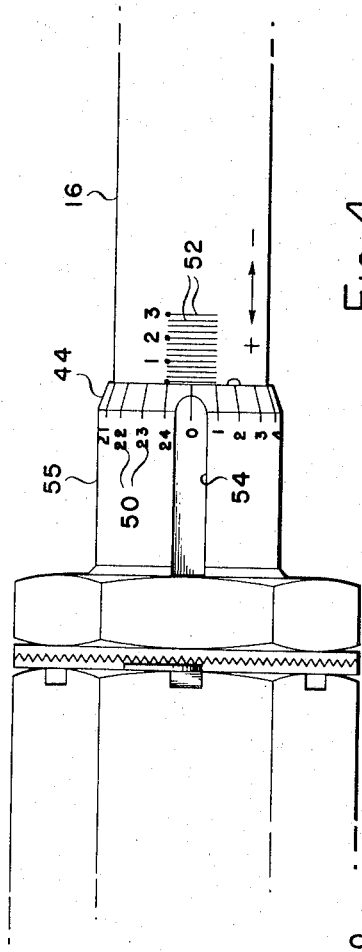
FIG. 4 is a fragmentary enlarged full view of the calibrated portion of a pitch link assembly embodying my invention.
Figure 3:
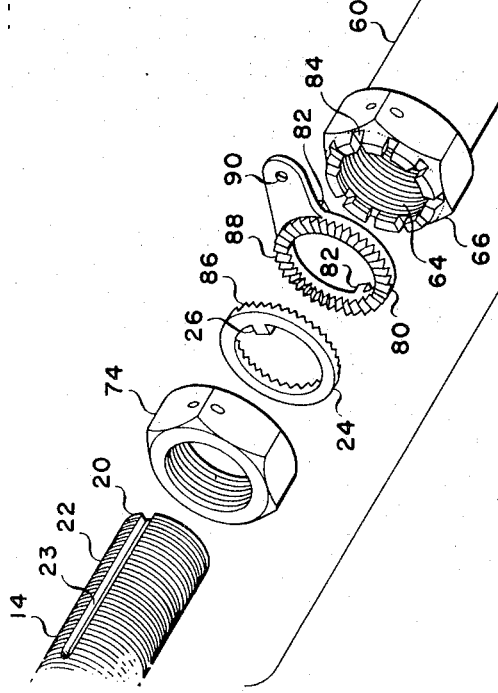
FIG. 3 is an exploded perspective view of the elements of a pitch link assembly and internal locking device embodying my invention.

In the illustrated embodiment of the invention, and referring to the drawing in which reference characters correspond to like numerals in the following description, FIG. 1 shows a preferred environment for utilization of a plurality of connecting rod, push-pull or pitch link assemblies 10. Each assembly 10 is combined with a gyro assembly 11 and one of a plurality of rotor blade assemblies 12, an example of which combination is more fully shown and described in U.S. Pat. No 3,415,324, issued Dec. 10, 1968.

FIG. 2 illustrates an assembled pitch link assembly 10 comprehended by this invention and in a condition ready for use. FIGS. 3-6 illustrate the preferred embodiment of the invention. Pitch link assembly 10 includes a pair of similarly constructed hollow rods 14, 16 the latter being telescopically related to the former. Each rod 14 and 16 has a conventional rod end 17 including a spherical bearing (not shown) for connecting the assembly 10 into its position as shown in FIG. 1. Rod 14 comprises a hollow element having a plurality of splines 18 (FIG. 5) internally disposed intermediate its length; i.e., between its outer end 17 and its inner end 20, and external threads 22 generally extending a distance from its inner end 20 to the splines 18. A longitudinal slot 23 is provided along the length of the threads 22 for keying thereto a tang-ring or washer 24 having an internal radially directed projection 26 slidable in the slot 23 when the tang ring 24 is mounted upon rod 14.

Rod 16 comprises an element having a splined longitudinal portion 28 extending outwardly from its telescoped inner end 30, for cooperative engagement with the splines 18 of rod 14, thereby providing means for a non-rotational orientation connecting such rods together. An externally threaded portion 32 is provided intermediate the length of rod 16 for engaging internally disposed threads 34 of a calibrated sleeve 36 (FIG. 3) circumscribing such rod. A pair of spaced generally parallel circumferential grooves 38 are included in an external cylindrical surface 40 at one end of calibrated sleeve 36, and an annular groove 42 is disposed in the internal wall of such sleeve between or intermediate the planes of grooves 38, for purposes to be described hereinafter. A tapered band 44 is provided at the other end of sleeve 36 and includes a graduated scale or indicia 50 for correlation to a similar scale or indicia 52 etched in rod 16, whereby the differences in the adjusting of the length of the rod assembly are measurable. The rotation of scale 50 is a function of the linear distance through which rod 16 travels for each revolution of calibrated sleeve 36. In the preferred embodiment, one revolution of calibrated sleeve 36 displaces rod 16 a distance of one thread pitch. A longitudinal slot 54 is provided in a portion 55 for keying to sleeve 36 a second tang ring 56 having an internally radially directed projection 57 slidable in the slot 54 when the tang ring 56 is mounted upon sleeve 36.

It may be noted here that a proper orientation of the axes A (FIG. 2) of the bearings in the ends 17 of rods 14 and 16, with respect to usable pivot or pin connections 58 and 59 (FIG. 1) between the gyro and blade assemblies 11 and 12, may be facilitated by forming the longitudinal slots 23 and 54 along a peripheral line in their respective elements 14 and 16. Although accurate design of the rod ends 17 and the bearings therein, and in which axes A lie, for the purpose of proper pin connections to the gyro and blade assemblies is a well-known engineering expedient, such preferred incorporation of slots 23 and 54 to their respective elements 14 and 16 so that axes A and the pin connecting axes lie coincident to each other, enhances and simplifies the operational adjustability for this assembly 10 embodying my invention in its utilization in a rotary wing aircraft.

A union sleeve or element 60 is provided to clamp and actuate the calibrated sleeve 36 to rod 14. The sleeve 60 (FIG. 5) includes an internal annular projection 62 thereon at its right end for seating against a shoulder 63 formed in sleeve 36 by reducing the portion containing surface 40. The left portion of union sleeve 60 includes internal threads 64 for engagement with the external threads 22 of rod 14. Thus, the threading of the sleeve 60 upon the rod 14 clamps the sleeve 36 to the rod 14 and establishes the fixed union therebetween.

Figure 5:
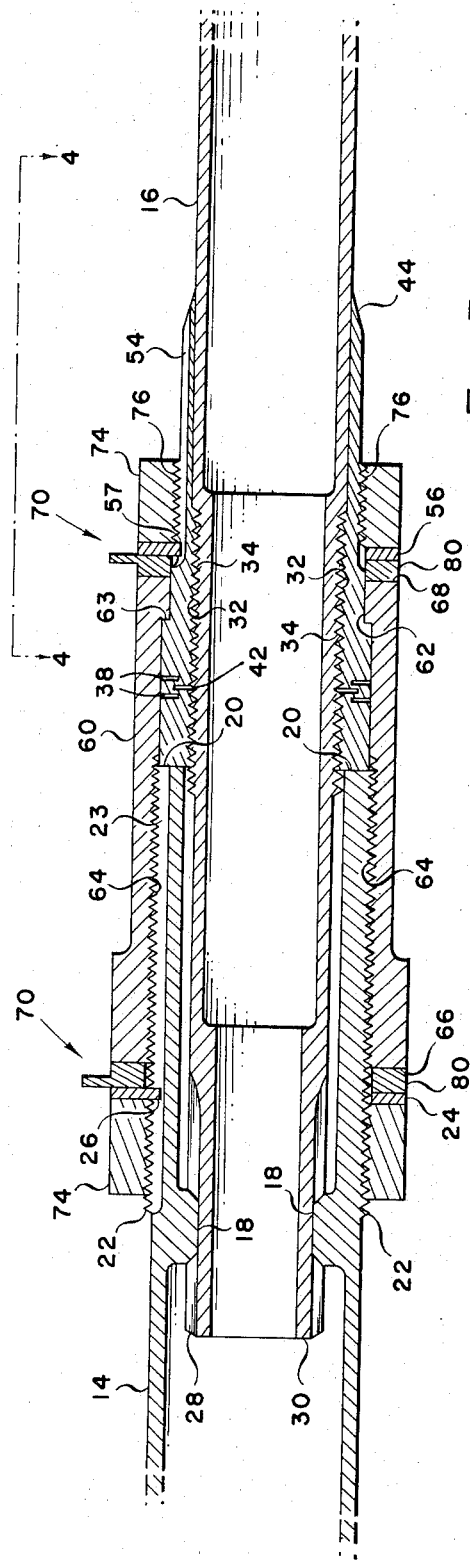
FIG. 5 is a sectional view of a pitch link assembly and internal locking device embodying my invention.

It is adjacent the opposing ends 66 and 68 (FIG. 3) of union sleeve 60 that a pair of locking means 70 are respectively disposed, as shown in FIG. 5. Each locking means comprises a jamb nut 74, a tang ring 24 or 56, and a lock ring 80 adapted for direct engagement with its corresponding tang ring 24 or 56. At least one longitudinally or axially extending tab 82 (FIG. 3) is included on each lock ring 80 for cooperative engagement with one or more of a plurality of correspondingly shaped openings or notches 84 provided on each end 66 and 68 of union sleeve 60. Each tang ring 24 and 56 includes a plurality of radially extending serrations 86 adapted for cooperatively engaging corresponding facing serrations 88 formed in its associated lock ring 80 abutting an end 66 or 68 of union sleeve 60. An integrally formed aperture 90 may be provided on each lock ring 80 for addition of a safety wire 92 (FIG. 2) which securely connects an associated jamb nut 74 thereto after final adjustment for assembly 10. In the instant utilization of assembly 10, a jamb nut 74 is threaded for cooperative engagement on external threads 22 of rod 14, and a jamb nut 74 is threaded for cooperative engagement on external threads 76 of calibrated sleeve 36.

In assembly, the above-described elements constituting the locking device 70, which includes the tang ring 56 and a union sleeve 60 are run onto the inner end 30 of rod 16. A second locking device 70, including the tang ring 24 is run onto rod 14. Calibrated sleeve 36 is then threaded to rod 16, and the O-marking on indicia 50 may be superimposed or aligned with the O-marking on indicia 52 (only one-half of such marking showing in FIG. 4), in preparation for utilization of assembly 10. Jamb nut 74 may then be loosely threaded onto the threads 22. Rod 14 is then pushed or telescoped upon rod 16, engaging its splines 18 with the splines 28 on rod 16. Thereafter, union sleeve 60 is further threaded (to the left in FIG. 5) on to rod 14 until inner end 20 of rod 14 abuts and actuates calibrated sleeve 36 by squeezing or compressing the grooves 38 and 42. Both jamb nuts 74 may then be run or turned toward union sleeve 60 to further effect general assembly of pitch link assembly 10, the locking devices 70 being confined between the union sleeve 60 and the respective jamb nuts 74.

In regard to the non-rotational orientation for the ends 17 of rods 14 and 16, the splined connection between the splining elements 18 and 28 may be precisely arranged such that axes A of the bearings for ends 17 are properly oriented with respect to their connections to pivot pins 58 and 59 (FIG. 1) associated with gyro and blade assemblies 11 and 12. In regard to the relative axial translation for and between rods 14 and 16, rotation of calibrated sleeve 36 to the right (FIG. 5), after which rod 14 may be further telescoped upon rod 16 to once again abut the left end of sleeve 36, adjustably shortens the effective length between axes A of rod ends 17. On the other hand, rotation of calibrated sleeve 36 to the left on rod 16 adjustably lengthens the effective length between the axes A of rod ends 17. Rotation in either direction of calibrated sleeve 36, of course, assumes that the locking devices 70 are backed off, loosened or made slack from their tightened or torqued positions about the respective ends of union sleeve 60, and that union sleeve 60 is not clamping sleeve 36 to rod 14.

PREFERRED EMBODIMENT OF THE CLAIMED INVENTION

Figure 6:
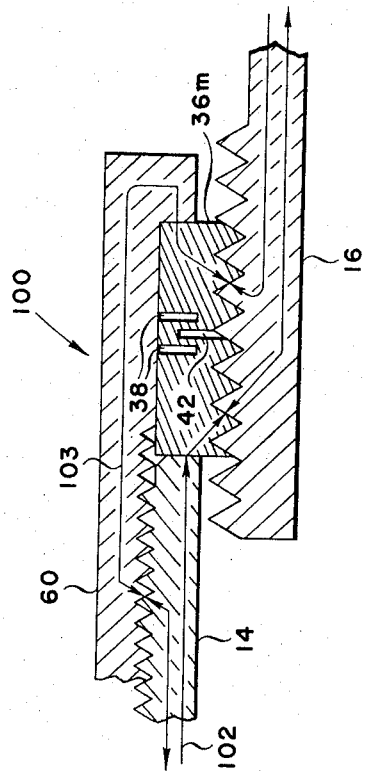
FIG. 6. is an enlarged sectional view of a portion of the view shown in FIG. 5.
Figure 7:
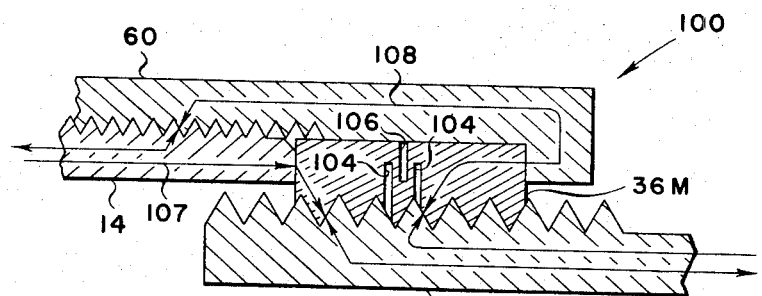
FIG. 7 is a view similar to FIG. 6 but modified.

An internal locking device 100 is included in mechanism 10 (FIGS. 5, 6 and 7). A primary purpose of device 100 is to provide by external means an exact locking or securing feature for two elements in relative positions to each other, without damage from use to the threads of such elements or those of the device. An advantage of reuseability of the locked elements and the device itself is obtained. The three grooves 38, 38 and 42 provide elastic compressibility for the sleeve 36 of FIG. 5, and for a sleeve 36m in FIG. 6 (modified, as it need not be only a calibrated sleeve) when a clamping force is applied externally, without permanently deforming the device 100; i.e., by the material of such device not exceeding its elastic limits upon application of force to a sleeve 36 or 36m. Such force is obtained by threading or tightening an element such as union sleeve 60 further onto an element such as rod 14. The material in sleeve 36 or 36m in the portion or region thereof surrounding and defining grooves 38 and 42 provides spring characteristics for such element and functions in a manner similar to a leaf spring squeezing or compressing the grooves and effectively foreshortening the length of the union sleeve 60, when forces are applied such as illustrated by force lines 102 and 103. As a result, a positive surface-to-surface contact, as shown by facing arrow heads on force lines 102 and 103 at the junctions of the threads of rod 16 and sleeve 36 or 36m, and rod 14 and sleeve 60, is established, thereby eliminating the slop or difference in the pitch tolerance which otherwise exists between such threads. A full bearing, in other words, of the threads is maintained. Tolerance spread, of course, exists in any conventional threading of two elements, even were rods 14 and 16 directly threaded together. The forces 102, 103, however, as generated in this invention, are capable of traveling with continuity between rods 14 and 16, thereby providing a locking, in an exact longitudinal position, of rod 16 relative to rod or element 14. As utilized in pitch link assembly 10, this particular adjustment is further secured by means of torquing jamb nut 74 against or toward end 68 of clamping sleeve 60. In the environment of a rotary wing aircraft, any movement of the nature of a fraction of or one or more thousandths of an inch in the effective distance between the axes A of rod ends 17 affects or changes the pitch angle for an associated blade 12 and defeats the purpose of an adjustable pitch link assembly. The positive action of locking device 100 with its ability to accommodate a modest foreshortening of the sleeve 36m achieves a precise adjustment eliminating such movement, and of course assures a lock on the desired setting of the micrometer calibrations 50, 52.

FIG. 7 illustrates a sleeve 36M modified over that of sleeves 36 and 36m, to the extent that two spaced grooves 104 are internally disposed in the interior wall of its bore and a single groove 106 is disposed about the circumference of sleeve 36M between the planes of annular grooves 104. The same effect is achieved here, through the action along force lines 107 and 108 as those for sleeves 36 and 36m in FIGS. 5 and 6.

Figure 9:
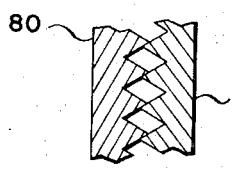
FIGS. 9, 10 and 11 are fragmentary views of the cooperative engagement, in varying degrees, of a lock ring and tang ring.
Figure 10:
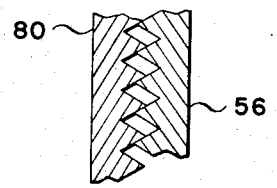
Figure 11:
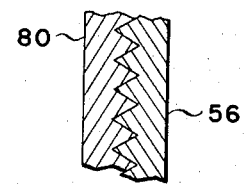

FIGS. 9 and 10 illustrate varying degrees of non-maximum engagement between a lock ring 80 and a tang ring 24 or 56, while FIG. 11 illustrates maximum engagement achieved in my invention between the facing serrations 86 and 88 on the tang ring 24 or 56 and lock ring 80, respectively, for an infinite adjustment in length of the assembly 10 for or by any degree of rotation of calibrated sleeve 36. In practice heretofore, a sleeve similar to union sleeve 60 would include at one of its ends notches at equal intervals about its periphery and with which a tab such as 82 (FIG. 3) on ring 80, would cooperate or seat. Also, a projection on a tang ring, such as projection 26 on tang ring 24, would correspondingly seat in a slot of a rod, such as in slot 23 of rod 14. In such a case, maximum engagement of the noted serrations, such as shown in FIG. 11, could only be achieved at one or a very limited number of adjusted lengths for the connecting rod assembly, and varying percentages to such maximum engagement would otherwise obtain upon torquing of a jamb nut against such rings and sleeve, such as suggested by FIGS. 9 and 10. i.e., were a calibrated sleeve incrementally turned so as to effectively change the length of the assembly, the retorquing of a jamb nut against a sleeve such as sleeve 60 would not necessarily mean 100percent (maximum) engagement of such serrations, as the fixed positions of a projection 26 in slot 23 and a tab 82 in an equally spaced notch from its adjacent notches would prevent such serrations from wholly meshing. As a result, the adjusted effective length of a pitch link or push-pull rod assembly would be subject to creep between such serrations, depending upon the degree of torquing of a jamb nut. This would lead to a change in such length in the event the rotary blade system was subject to vibration, as it normally is in flight, in addition to changes wrought by repetitious torquing of the jamb nut.

While I have not been able to achieve in my preferred embodiment (because of size limitations of the involved elements, the number of serrations possible for a given size, and the optional use of a second tab 82) a 100 percent maximum engagement of such serrations for each instance of incremental or other turn of calibrated sleeve 36, after adjusting for a desired effective length for assembly 10, the preferred embodiment of my invention does achieve maximum engagement in at least a minimum of 92 percent connections of such serrations, regardless of an infinitesimal or infinite turn of calibrated sleeve 36. In other words, a purpose here is to prevent incomplete or non-engagement of such serrations and to obtain maximum engagement between such serrations for any adjusted length of the mechanism. This has been accomplished by providing staggered intervals a, b, c, d (FIG. 8) between notches 84 on union sleeve 60 and determining by trial and error which of such notches 84 provides maximum engagement for serrations 86 and 88, remembering that each tang ring 24 and 56 is restricted to the same non-turning or turning movement of rod 14 or calibrated sleeve 36, as the case may be. After a desired effective length has been determined by rotation of calibrated sleeve 36, and union sleeve 60 has been torqued to a required degree, say, about 100 inch lb., to effect the locking of the calibrated sleeve 36 to rod 16, the tab or tabs 82 on each lock ring 80 is rotated from, say, a notch 84-1 to a notch 84-2, to a notch 84-3, to a notch 84-4, etc., until it is observed that with the tab or tabs 82 seated in one of such notches, the meshing of serrations 88 is at a maximum engagement with serrations 86 on a tang ring 24 or 56. The associated jamb nut 74 is thence torqued toward union sleeve 60.

In other words, creep between the tang and lock rings, upon torquing of a jamb nut, is reduced to an acceptable minimum if not reduced to zero. Where a total number of serrations are given for each lock ring and tang ring, we may mathematically determine usable staggering intervals a, b, c, d, . . . between notches 84. Only the size of the union sleeve 60, the number of serrations, and the number of tabs 82 on each lock ring 80, limit both the number of usable or practical staggering intervals that are incorporated therein and the number of maximum serration engagements.

It should be understood that no significant correlation exists concerning alignment or non-alignment of the radially extending axes for notches 84 on opposite ends of union sleeve 60, in order to practice the invention, although such a correlation may be developed for the purpose of facilitating manufacture of sleeve 60.

Figure 8:
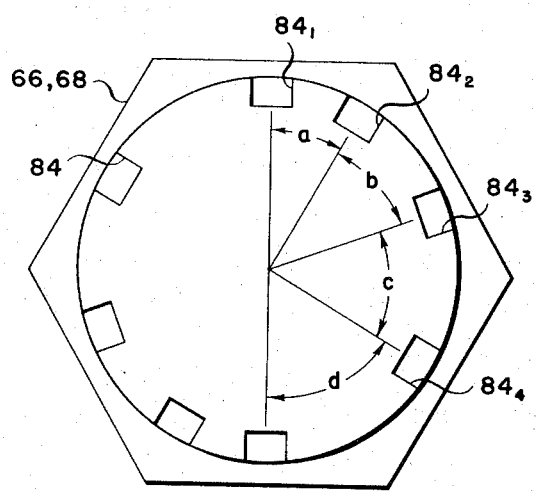
FIG. 8 is an end view of a union sleeve utilized in the invention.

In the preferred embodiment illustrated, a pair of projections 82 match corresponding opposing notches 84 on each end 66 and 68 of sleeve 60, however, only one projection 82 is necessary. Thus, staggered intervals each having a different arcuate distance from any other may be provided throughout the entire periphery of an end 66 or 68, if desired (as shown in FIG. 8), rather than for merely each 180° of such periphery.

As stated above in somewhat less detail, FIGS. 9, 10 and 11 illustrate the play which occurs in serrations of known lock and tang ring combinations that have been utilized heretofore, particularly in pitch link or push-pull rod assemblies for helicopters. FIGS. 9 and 10 illustrate the impaired engagement of such serrations after a tang ring has been keyed to a rod and a lock ring is thence put into cooperative engagement therewith after keying with a notch in a sleeve. Subsequent torquing of a jamb nut against the tang ring in fact introduces the creep factor, thereby causing looseness in the assembly which may be, and in many instances, is reflected in a change in rotor blade pitch induced thereby and/or induces a flutter of the blade. Such flutter makes the blade hunt for a pitch setting, and this induces aerodynamic instability. FIG. 11 illustrates the maximum engagement of such rings by the inclusion of staggered intervals $a, b, \ldots$, for notches 84 in sleeve 60, thereby assuring no change in the adjusted effective length for the assembly. Maximum engagement is repititiously possible, of course, for any adjustable length, depending upon the size of sleeve 60, the number of notches 84 and serrations 86 and 88 designed into the locking device 70, and the number of tabs 82 incorporated into a lock ring 80.

In operation, a number of sutuations exist for a given helicopter in which a change of a rotor blade or pitch link assembly is necessary. The following outline provides a description concerning the manner of effecting a required condition for a rotor blade mounted thereon by making changes at the time of installation of an assembly 10 and/or of a rotary blade. 1. Substitution of assembly 10 for a known or conventional pitch link assembly.

a. Installation with the old blade. The pitch deviation marking on the blade is noted and the new assembly 10 is set for that deviation. The old assembly is removed and is replaced by installation of adjusted assembly 10. This can be accomplished directly assuming that the pin-to-pin dimensions of the old and new link assemblies are the same.

b. Installation with a new blade. To install a new blade with a new assembly 10, the incidence of deviation for such blade is noted in relation to the attitude incidence setting for the old-and -removed blade. The algebraic sum of these two settings is determined and thence set into the new assembly 10. Both assembly 10 and the new rotor blade are then installed. 2. Substitution of assembly 10 for an assembly 10.

a. Installation with an old installed blade. The same setting on calibrated sleeve 36 of the used or obsolete assembly 10 is set into the new assembly 10, after which the new assembly 10 is installed.

b. Installation with a new blade. Noting the old blade's attitude incidence setting and such setting for the new blade to-be-installed (determined at the factory by known tracking practice provided for newly manufactured blades), an algebraic addition is made, and the calculated sum is then set into the new assembly 10, after which both new assembly 10 and blade are installed.

Advantages of assembly 10 should now be apparent. Log keeping is no longer required for each manufactured blade after its incidence angle has been originally determined at the factory in accordance with standard practice. Its incidence angle is accordingly marked on the blade itself so that out in the field when it is to replace another blade in a mounting including assembly 10, the mechanic may make the necessary adjustments in assembly 10 by merely rotating calibrated sleeve 36 the required degree. After installation, the additional re-tracking procedure is no longer required.

Another advantage in assembly 10 is the interchangeability of the various elements constituting same. Each part thereof is replaceable with stock parts presently available. The utilization of locking ring 80 is an example of stock parts being available, as it is less expensive to use it, having 2 projections 82 thereon, rather than going to the expense of manufacturing one having only one such projection thereon. Satisfactory maximum engagement can nevertheless be obtained.

An example of a material for a sleeve 36, 36m or 36M, providing for spring characteristics which lend themselves to the compressibility of the sleeve without exceeding the elastic limits of deformation of the material, is SAE 1095 steel. What has been achieved by use of this feature is a means for locking a nut or other threaded device to a shaft, even though the shaft is not accessible from the outside as it is disposed within an externally mounted member.

In the preferred embodiment, indicia 52 on rod 16 comprise 0.050 in. spacings between each etched linear graduation, for a circumferential distance of 0.6 in., thereby providing an infinite adjustability for assembly 10 in a rotary wing aircraft.

Pursuant to the requirements of the patent statutes, the principle of this invention has been explained and exemplified in a manner so that it can be readily practiced by those skilled in the art to which it pertains or with which it is most nearly connected, such exemplification including what is presently considered to represent the preferred embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:

1. An internal locking device actuable only by externally mounted elements therewith, comprising in combination:

a threaded member;

a sleeve member having internal threads for cooperative engagement with said threaded member, a plurality of annular grooves in adjacently spaced relation in said sleeve member and alternately on the interior and the exterior thereof; and actuating means axially engaging said sleeve member on both ends thereof whereby generation of a force generally longitudinally-directed in said sleeve member compresses said grooves so as to provide a surface-to-surface contact between the threads of said sleeve member and said threaded member, thereby making lockable the threads of the latter to the former and providing longitudinal adjustability without exceeding the elastic limits of deformation of the material of said sleeve member.

2. The device of claim 1 wherein said grooves comprise
a pair of spaced circumferential grooves, and
an annular groove disposed internally of said sleeve member intermediate the planes of said circumferential grooves.

3. The device of claim 1 wherein said grooves comprise
a pair of spaced annular grooves disposed internally of said sleeve member, and
a circumferential groove disposed intermediate the planes of said annular grooves.

4. The device of claim 1 in combination with a means for securing and actuating said sleeve member.

5. The combination of claim 4 wherein said means comprises
an externally threaded element abutting one end of said sleeve member,
an internally threaded element engaging the other end of said sleeve member and connected to said externally threaded element,
relative force between such externally and internally threaded elements compressing the grooves in said sleeve member.

6. An adjustable rod having internal locking means comprising:
a first externally threaded and internally splined hollow rod member;
a second externally splined rod member threaded intermediate its ends and being telescoped internally of said first rod member, its splines engaging those of said first rod member;
a first internally threaded sleeve disposed about and threadedly engaging said second rod member and abutting said first rod member, means in said sleeve defining a plurality of
annular grooves, the planes of said grooves being mutually parallel to one another, at least one of said grooves being interiorly and at least one being exteriorly of said sleeve;
a second internally threaded sleeve disposed about said first rod member and said first sleeve in threaded engagement with said first rod member and bearing axially against said first sleeve so as to urge the same into axial engagement with said first rod member and compress said first sleeve in the region of said annular grooves.

7. The adjustable rod of claim 6 wherein locking means is provided at either end of said second sleeve.

8. The adjustable rod of claim 7 wherein said locking means includes at each such end an interlocking lock ring and washer combination engaging said second sleeve in relative non-rotatable relation.

9. The adjustable rod of claim 8 wherein said locking means further includes a jamb nut engaging each said lock ring and washer combination.

* * * * *